(12) United States Patent
Jacon et al.

(10) Patent No.: US 11,920,519 B2
(45) Date of Patent: Mar. 5, 2024

(54) FIRE RESISTANCE DEVICE DESIGNED TO BE PLACED BETWEEN ONE END OF A MOUNTING STRUT FOR AN AIRCRAFT TURBOMACHINE AND A COWLING OF THE TURBOMACHINE DELIMITING AN INTER-FLOW COMPARTMENT

(71) Applicant: SAFRAN AIRCRAFT ENGINES, Paris (FR)

(72) Inventors: Bruno Alexandre Didier Jacon, Moissy-Cramayel (FR); Hervé Simonotti, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 206 days.

(21) Appl. No.: 17/311,539

(22) PCT Filed: Nov. 29, 2019

(86) PCT No.: PCT/FR2019/052845
§ 371 (c)(1),
(2) Date: Jun. 7, 2021

(87) PCT Pub. No.: WO2020/120863
PCT Pub. Date: Jun. 18, 2020

(65) Prior Publication Data
US 2022/0106911 A1  Apr. 7, 2022

(30) Foreign Application Priority Data

Dec. 14, 2018 (FR) ...................................... 18 72912

(51) Int. Cl.
*F02C 7/25* (2006.01)
*B64D 29/02* (2006.01)

(52) U.S. Cl.
CPC ................. *F02C 7/25* (2013.01); *B64D 29/02* (2013.01)

(58) Field of Classification Search
CPC ............ F02C 7/25; B64D 27/26; B64D 29/02
See application file for complete search history.

(56) References Cited

U.S. PATENT DOCUMENTS

| 2008/0053107 A1* | 3/2008 | Weaver | F02C 7/28 |
| | | | 415/138 |
| 2011/0024994 A1 | 2/2011 | Bunel | |

(Continued)

FOREIGN PATENT DOCUMENTS

FR  2 920 215 A1  2/2009

OTHER PUBLICATIONS

International Search Report dated Mar. 19, 2020 in PCT/FR2019/052845 filed on Nov. 29, 2019, 2 pages.

(Continued)

*Primary Examiner* — Michael H Wang
(74) *Attorney, Agent, or Firm* — Oblon, McClelland, Maier & Neustadt, L.L.P.

(57) ABSTRACT

A fire resistance device intended to be placed between a mounting strut of a double-flow aircraft turbomachine and a connecting cowling equipping this turbomachine, the connecting cowling being intended to connect an upstream ring delimiting an inter-flow compartment, to an arm that extends radially across a secondary flow of the turbomachine. The device includes two contacting lips extending along different lines, of which a first lip with a C-shaped section is integrated within a contact structure, and a second lip including at its end a protruding blocking portion protecting the contact structure.

13 Claims, 13 Drawing Sheets

(56) References Cited

U.S. PATENT DOCUMENTS

| | | | |
|---|---|---|---|
| 2015/0226130 A1* | 8/2015 | Salamon | F02C 7/28 |
| | | | 415/208.1 |
| 2018/0156051 A1 | 6/2018 | Strutt | |
| 2018/0156130 A1* | 6/2018 | Takeuchi | E04B 1/948 |
| 2018/0163631 A1 | 6/2018 | Takeuchi | |
| 2018/0266263 A1* | 9/2018 | Jacon | F16J 15/4476 |
| 2020/0263608 A1* | 8/2020 | Dickert | F02C 7/25 |

OTHER PUBLICATIONS

French Preliminary Search Report dated Oct. 22, 2019 in French Application No. 18 72912 filed on Dec. 14, 2018 (with translation of category of cited documents), 2 pages.

* cited by examiner

FIRE RESISTANCE DEVICE DESIGNED TO BE PLACED BETWEEN ONE END OF A MOUNTING STRUT FOR AN AIRCRAFT TURBOMACHINE AND A COWLING OF THE TURBOMACHINE DELIMITING AN INTER-FLOW COMPARTMENT

TECHNICAL FIELD

The invention relates to the fire resistance function between an inter-flow compartment of a double-flow aircraft turbomachine, and an upstream area of a mounting strut of this turbomachine. In particular, it aims to prevent a fire that started in the inter-flow compartment from spreading into the upstream area of a mounting strut.

The invention applies to any type of double-flow turbomachine, and in particular to a turbojet.

PRIOR ART

In a double-flow aircraft turbomachine, it is usually provided, downstream of the fan, one or more arms that extend radially across the secondary flow. This arm is typically arranged so as to connect a fan compartment located around the outer shell of an intermediate casing, to an inter-flow compartment. These two compartments conventionally house equipment and easements, whereas the arm placed between them enables the passage of various elements such as electrical cables, and/or fluid pipes.

The radially inner end of such an arm is connected to an upstream ring, partly delimiting the inter-flow compartment radially towards the outside. Thus, this ring forms the upstream end of all of the cowlings forming the outer casing of the inter-flow compartment. In order to ensure the junction between the arm and the upstream ring, it is provided to insert between them two connecting cowlings, which are respectively located laterally on either side of an upstream end of the mounting strut.

The mounting strut, which is used to fasten the turbomachine on a wing element of the aircraft, may indeed have an upstream end close to the junction between the arm that extends across the secondary flow, and the upstream ring of the inter-flow compartment. Therefore, the issue of the fire-prevention function arises, since it is sought to avoid the spread of a possible flame that breaks out in the inter-flow compartment, in particular to prevent this flame from reaching the upstream area of the mounting strut located close by.

Consequently, there is a need to achieve a fire resistance device the design of which guarantees the desired function, permits its easy integration into the dense and complex environment of the area concerned, and enables easy manufacturing.

SUMMARY OF THE INVENTION

In order to address this issue, first of all the aim of the invention is a fire resistance device intended to be placed between an upstream end of a mounting strut of a double-flow aircraft turbomachine, and a connecting cowling equipping this turbomachine, said connecting cowling being intended to connect an upstream ring radially delimiting towards the outside a portion of an inter-flow compartment, to an arm that extends radially across a secondary flow of the turbomachine. According to the invention, the device comprises:

a contact structure comprising a first contacting lip preferably having a C-shaped section and defining a first contact end extending along a first line, preferably a curved line, the contact structure also comprising, at one of the longitudinal ends of the first contacting lip, an end section one of the ends of which is open and is in the continuation of the first lip, and the other end of which is blocked;

a support portion; and a second contacting lip supported by the support portion via a junction area that supports the end section of the contact structure, the second contacting lip having a second contact end extending along a second line different from the first line, the second contacting lip having at one of its ends a blocking portion protruding according to the second line, the blocking portion being located at a distance from and facing the blocked end of the end section.

Thus, the invention proves to be advantageous in that it provides a fire resistance device that proves to be efficient, which integrates perfectly into its environment, and the design of which makes it particularly easy and inexpensive to manufacture, for example by producing it in one piece.

The one-piece aspect is effectively made possible by the simple geometry of the device according to the invention, particularly by the use of contacting lips. These do not require for that matter the use of inserts during the manufacture of the device, as opposed to for example the implementation of, so-called bead or bulb, tubular contact areas. In addition, a lip usually proves to be easily deformable, such that it is not necessary to subject it to a specific prestressing operation after its assembly. The deformation required to guarantee its fire barrier function may simply result from the pressing of a surrounding element, such as for example the pressing of a moveable nacelle cowl seal intended to collapse in the area.

It should be noted that these advantages are not called into question by the presence of the end section blocked at one of its ends, given that the latter remains open at its other end. This feature particularly guarantees the easy manufacture of the one-piece part. This blocked end section, arranged at one of the longitudinal ends of the first contacting lip, makes it possible to locally control the sealing more easily, thanks to its transverse section more extended than that of the first C-shaped lip that it extends.

Furthermore, the C-shape of the first contacting lip proves to be advantageous in that it has a compatibility with the existing fire resistance devices, incorporating bulb seals equipped at their longitudinal ends with connection pins. Indeed, the longitudinal end of the first contacting lip of a fire resistance device according to the invention may thus perfectly cooperate with the connecting pin of an additional fire resistance device, already installed on the propulsion unit. This complementarity of shapes facilitates the junction between the two devices, which is comparable to an interlocking of the pin into the open section of the first contacting lip.

In other terms, the C-shape of the first lip makes it possible to facilitate the connection of the device according to the invention to a conventional device, already equipping the propulsion unit. Consequently, when this propulsion unit comprises two fire resistance devices connected in such a way as to be in the continuation of one another, the replacement of only one of the two devices becomes possible. The maintenance of these fire resistance devices is thereby facilitated and secured.

Furthermore, with the contact structure and the second contacting lip, the fire resistance device according to the invention makes it possible to form two different and substantially adjacent physical barriers. One is provided to stop the possible fire in the inter-flow compartment so that it does not spread circumferentially towards the lateral face of the strut or radially towards an upstream end face of the latter, and the other is provided such that this possible fire does not spread axially downstream, along this same lateral face of the strut.

One of the specific features of the invention resides in the presence of the protruding blocking portion within the second contacting lip. This blocking portion comes to cover, without contacting it, the blocked end of the end portion provided within the contact structure, in the continuation of the first lip. During operation, when this end portion deforms optionally allowing an opening section to the flame appear, the blocking portion that covers it advantageously reduces the risks of axial penetration of this flame into the upstream area of the strut, or even reduces them to nothing. The gap kept between the blocking portion of the second lip, and the blocked end extending the first lip, does not make it possible to impede the deformation of the contact structure during the operation of the propulsion unit. This gap forms, with the blocking portion of the second lip and the blocked end extending the first lip, a sort of chicane considerably reducing the risk that the flame follows it until spreading through the possible opening section mentioned above, emanating from the deformation of the blocked end of the contact structure.

The invention preferably provides at least one of the following optional technical features, taken alone or in combination.

The blocking portion has a first contact face forming a portion of the second contact end of the second contacting lip, as well as a second face opposite the first and moving away from the first contact face by moving closer to the blocked end of the end section, the second face preferably being curved.

The blocked end of the end section has a domed shape in the direction of the blocking portion belonging to the second contacting lip. The end section may also incorporate a bulb section extended by the blocked end, without departing from the scope of the invention.

In the direction of the second line, the blocking portion ends set back in relation to the first contact end. This limits the risks that this blocking portion comes into contact with the element against which the first contact end presses, and deforms following this contact.

As mentioned previously, the device is preferably one piece.

Said second line is straight, and preferably substantially orthogonal to a first substantially flat contact surface wherein the first curved line is inscribed. Nevertheless, other line shapes and other inclinations may be retained depending on the support surfaces to be contacted, without departing from the scope of the invention.

The device also comprises a fastening portion supporting the first contacting lip, said fastening portion preferably being traversed by fastening element through holes.

The support portion supports, opposite the second lip and its junction area, elongated fastening elements. These elongated fastening elements may then easily cooperate with the connecting cowling, for better holding on the latter.

The device is formed by the superposition of at least one layer made of elastomer material, preferably made of silicone material, and at least one fibrous layer, preferably made of ceramic, glass or meta-aramid (poly(m-phenylene isophthalamide)). Other types of layers are nevertheless possible, without departing from the scope of the invention. It is noted that a ceramic fabric layer proves to be particularly effective for the fire resistance function, whereas a fibreglass layer makes it possible to stiffen the stack, and limit the creep of silicone elastomer in the plane orthogonal to the direction of superposition of the layers, in the event of mechanical stress according to this last direction. Finally, a layer of meta-aramid fibres also makes such a stiffening possible.

Preferably, one or more fibrous layers extend over the entire length of the first contacting lip and of the end section, in the same way as one or more fibrous layers extend over the entire length of the second contacting lip, including in its blocking portion.

Another aim of the invention is a propulsion unit for aircraft comprising a double-flow aircraft turbomachine, as well as a mounting strut of the turbomachine intended to fasten it on a wing element of the aircraft,
  the turbomachine including an inter-flow compartment arranged between a primary flow and a secondary flow of the turbomachine, as well as an arm that extends radially across a secondary flow and communicating with the inter-flow compartment, the latter being partly radially delimited towards the outside by an upstream ring connected to the arm with the aid of two connecting cowlings respectively arranged on either side of an upstream end of the mounting strut, in a transverse direction of the propulsion unit,
  the upstream end of the mounting strut comprising two lateral faces, as well as a peripheral bearing surface following the contour of a base of this upstream strut end.

According to the invention, the propulsion unit also comprises, associated with at least one of the two connecting cowlings, a fire resistance device such as described previously, placed between the upstream end of the mounting strut and the connecting cowling to which the device is fastened.

Preferably, the first contact end of the first contacting lip rests on the peripheral bearing surface of the upstream end of the mounting strut, and the second contact end of the second contacting lip rests on the corresponding lateral face of the upstream end of the mounting strut.

Preferably, the first curved line is inscribed in a first substantially flat contact surface, and substantially parallel with the transverse direction as well as with a longitudinal direction of the unit, and the second line defined by the second contacting lip is a straight line extending substantially parallel with a vertical direction of the unit.

Preferably, the second contacting lip is preferably stressed between the lateral face of the upstream end of the mounting strut, and a moveable nacelle cowl seal.

Finally, the propulsion unit also comprises, associated with the other of the two connecting cowlings, an additional fire resistance device placed between the upstream end of the mounting strut and the connecting cowling to which the additional device is fastened, the latter comprising a contact structure in bulb seal form, one longitudinal end of which is equipped with a connecting pin cooperating with the other longitudinal end of the first contacting lip belonging to the fire resistance device. As mentioned previously, this specific feature illustrates the fact that the invention has a shape making it possible to assemble the device on another existing device, of different design and already in place on the propulsion unit.

Other advantages and features of the invention will become apparent in the following non-limiting detailed description.

BRIEF DESCRIPTION OF THE DRAWINGS

This description will be made with regard to the appended drawings wherein

FIG. 6b' is a perspective view similar to the preceding, according to an alternative embodiment;

FIG. 15 is a perspective enlarged view of a portion of the device shown in FIG. 6a;

DETAILED DESCRIPTION OF PREFERRED EMBODIMENTS

Figure 1:
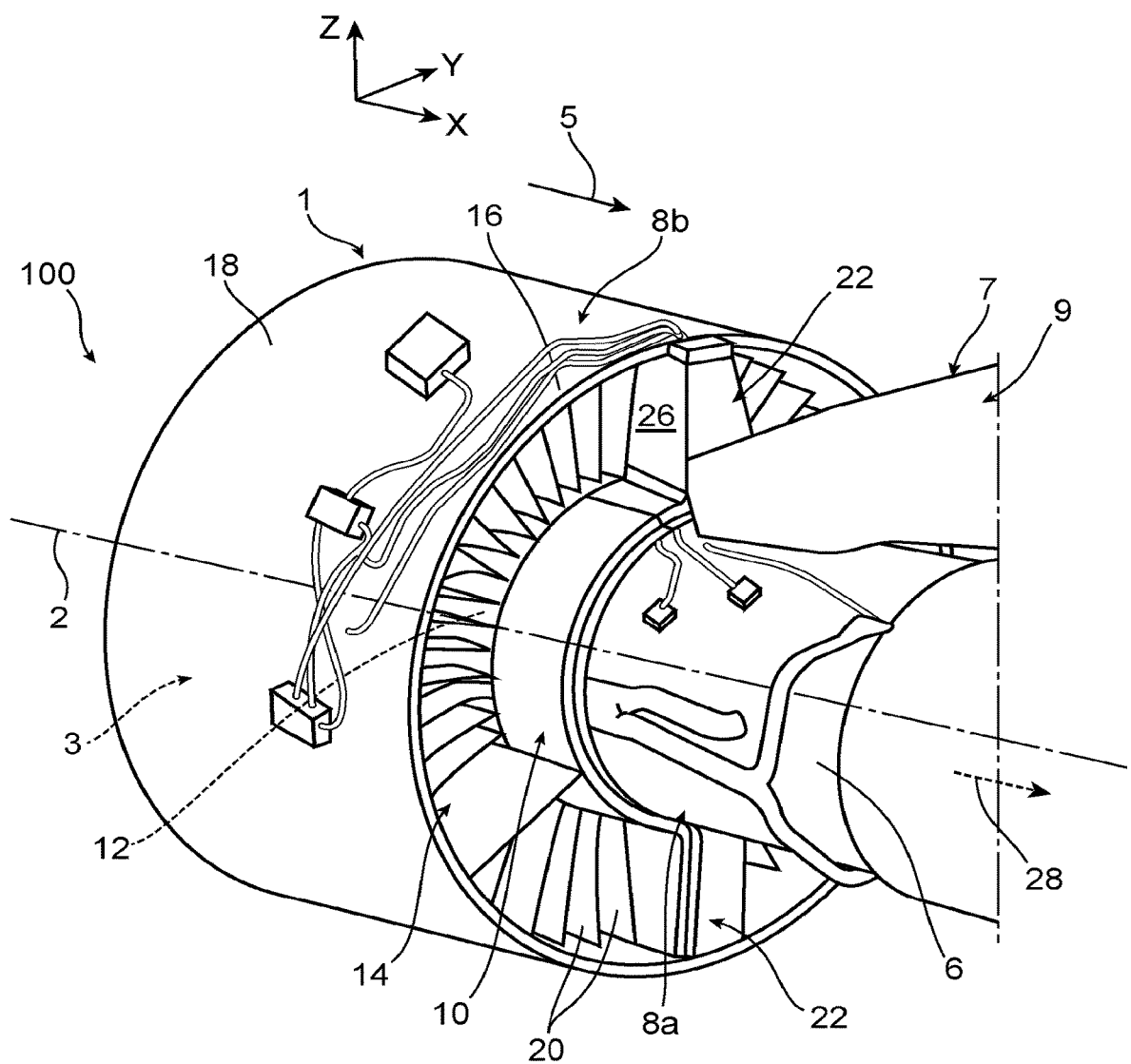
FIG. 1 is a perspective partial and schematic view of a propulsion unit according to a preferred embodiment of the invention.

With reference first of all to FIG. 1, it is partially represented a propulsion unit 100 according to a preferred embodiment of the invention. This unit 100 includes a double-flow turbomachine 1 for aircraft, as well as a mounting strut 9 of this turbomachine on a wing element of the aircraft (not represented).

The propulsion unit 100 has a longitudinal direction X, also corresponding to the longitudinal direction of the turbomachine 1 and to that of the strut 9. The unit 100 also has a transverse direction Y, as well as a vertical direction Z, corresponding to the direction of the height. The three directions X, Y and Z are mutually orthogonal and form a direct trihedral.

Preferably, the strut 9 makes it possible to suspend the turbomachine 1 under a wing of the aircraft. This strut includes a structural portion intended to take up the forces coming from the turbomachine, this portion usually being named primary structure or rigid structure. It generally adopts the shape of a box, of which only one upstream end 7 is represented in FIG. 1. The structure is also equipped with secondary structures (not represented) in the form of aerodynamic fairings.

In the preferred embodiment described and represented, the turbomachine 1 is a double-flow, and double-body, turbojet. The turbojet 1 has a longitudinal central axis 2 parallel with the direction X, and about which extends its various components. It comprises, from upstream to downstream depending on a main direction 5 of flow of the gases through this turbomachine, a fan 3 then a gas generator conventionally formed by compressors, a combustion chamber and turbines. These elements of the gas generator are surrounded by a central casing 6, also named "core" casing, which radially delimits towards the inside an inter-flow compartment 8a. This compartment 8a is moreover delimited radially towards the outside by one or more cowlings, of which an upstream ring 10 that is the only one represented in FIG. 1. The upstream ring 10 is arranged in the downstream continuation of a hub 12 of an intermediate casing 14 of the turbojet. The intermediate casing 14 also includes an outer shell 16 located in the downstream continuation of a fan casing 18. It also includes outlet guide vanes 20, arranged downstream of the fan blades and connecting the hub 12 to the outer shell 16.

The fan casing 18 and the outer shell 16 together delimit, radially towards the inside, a fan compartment 8b. This compartment 8b is moreover delimited radially towards the outside by one or more cowlings (not represented), forming part of a nacelle of the turbojet. Just like the inter-flow compartment 8a, this compartment 8b houses equipment and easements, as is widely known in the prior art.

One or more arms 22 are provided in order to connect the two compartments 8a, 8b. For example two arms 22 equip the turbojet, respectively arranged in so-called clock positions at 12 o'clock and at 6 o'clock. These arms 22 are hollow, and they make it possible for example to circulate electrical cables, and/or fluid pipes. More specifically, these arms connect a downstream portion of the outer shell 16, to the upstream ring 10. For this, they extend across a secondary flow 26 of the turbojet, this flow being partly delimited towards the outside by the shell 16 as well as by cowlings (not represented) disposed downstream of it, and partly delimited towards the inside by the upstream ring 10 of the inter-flow compartment 8a. The secondary flow 26 is added to a primary flow 28, which conventionally transits via the gas generator.

Now with reference to FIGS. 2 to 5, it is represented a portion of the propulsion unit 100 involving the upstream end 7 of the strut 9, the arm 22 located in clock position at 12 o'clock, as well as the upstream ring 10. More specifically, on either side of the upstream end 7 of the strut 9, in the direction Y, it is provided two connecting cowlings 30 ensuring the aerodynamic junction between the arm 22 and the upstream ring 10. Each cowling is respectively arranged on either side of the strut 9. This unit is thus not completely closed over 360°, but it has an angular opening centred on the clock position at 12 o'clock, where the two connecting cowlings 30 ensure the junction with the radially inner end of the arm 22.

In the figures, the assembly between the various elements is only represented for one side of the strut, but it is understood that an identical or similar assembly, preferably symmetrical, is provided on the other side of the upstream end 7 of the strut 9. Thus, on each side of the strut 9, the connecting cowling 30 has an upstream end 32 that is intended to be located in the downstream continuation of the intermediate casing hub. Its top end 33 (in a radially outer direction) connects to a wall of the arm 22, whereas its circumferential end 35 connects to a circumferential end of the upstream ring 10. Finally, its downstream end 38 forms a housing 39 of the angular groove sector type, housing a nacelle seal 40 that is preferably supported by a moveable nacelle cowl (not represented in FIGS. 2 to 5). This seal 40, also named three-branch seal or tripod seal, indeed includes a node from which extends a first seal portion 40*a* collapsing into the housing 39 then on the upstream ring 10, a second seal portion 40*b* collapsing into the housing 39 then on the arm 22, and a third seal portion 40*c* collapsing on a lateral face 42 of the strut. Each branch of the seal 40 is of the bulb or bead, tubular type.

Figure 3:
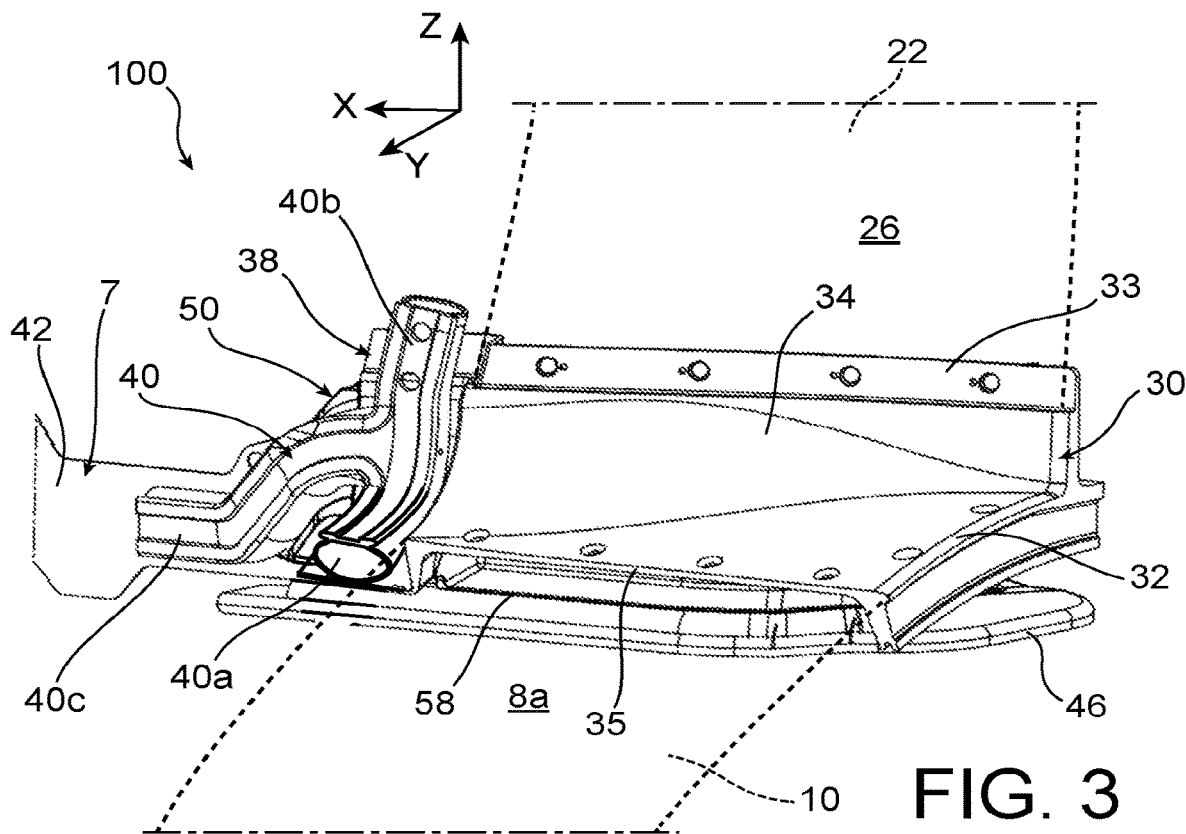
FIG. 3 represents a perspective view of the portion shown in the preceding figure.
Figure 4:
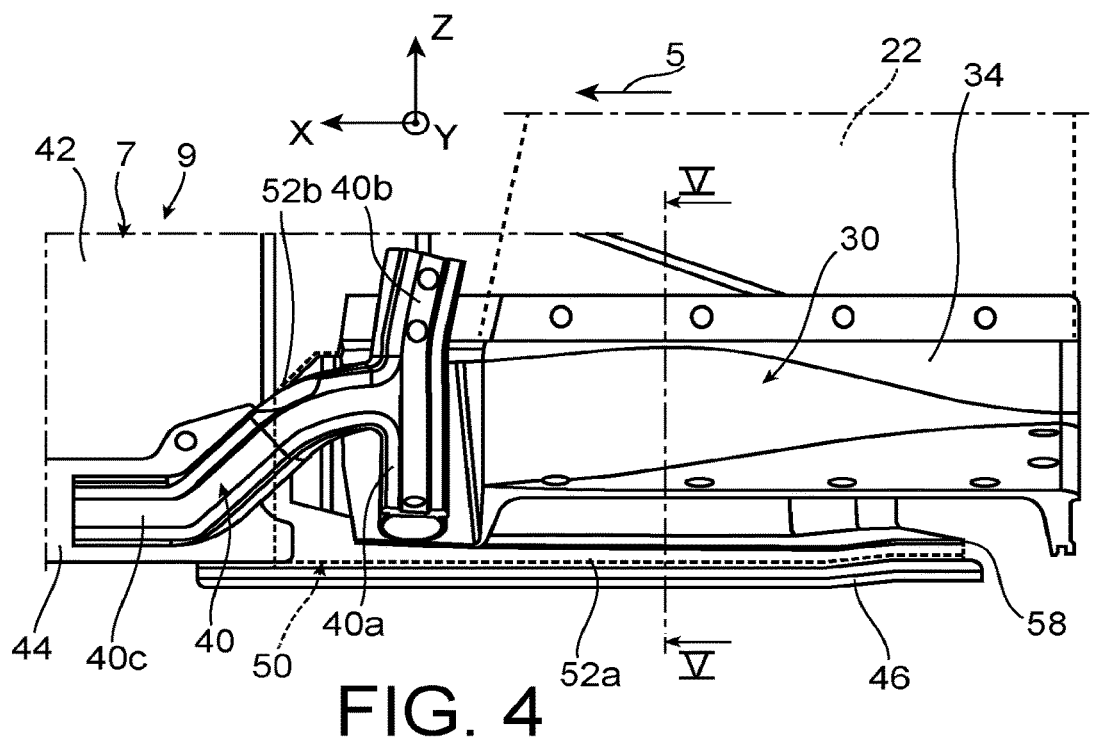
FIG. 4 is a side view of that shown in the preceding figure, with the fire resistance device represented in dotted lines.

Thus, the seal 40 adopts the position represented in FIG. 3 after the closure of the moveable nacelle cowl on which it is fitted, cowl that then has an outer surface arranged in the downstream continuation of an outer surface 34 of the connecting cowling 30.

The upstream end 7 of the strut 9 has a base 44, from which extends in particular the two lateral faces 42. The base 44 is integral with a peripheral bearing surface 46 generally U-shaped, following the contour of this base 44. It is substantially flat, parallel with the directions X and Y and substantially orthogonal to the lateral faces 42. Its function essentially resides in the establishment of a fire-prevention barrier between the inter-flow compartment 8*a*, and the upstream end 7 of the strut. In order to fulfil this function, the unit 100 comprises a fire resistance device 50 specific to the invention, associated with each connecting cowling 30. In an alternative embodiment of the invention that will be described later, the unit 100 comprises a fire resistance device specific to the invention and associated with one of the two connecting cowlings 30, as well as a more conventional additional fire resistance device, associated with the other connecting cowling 30.

Figure 2:
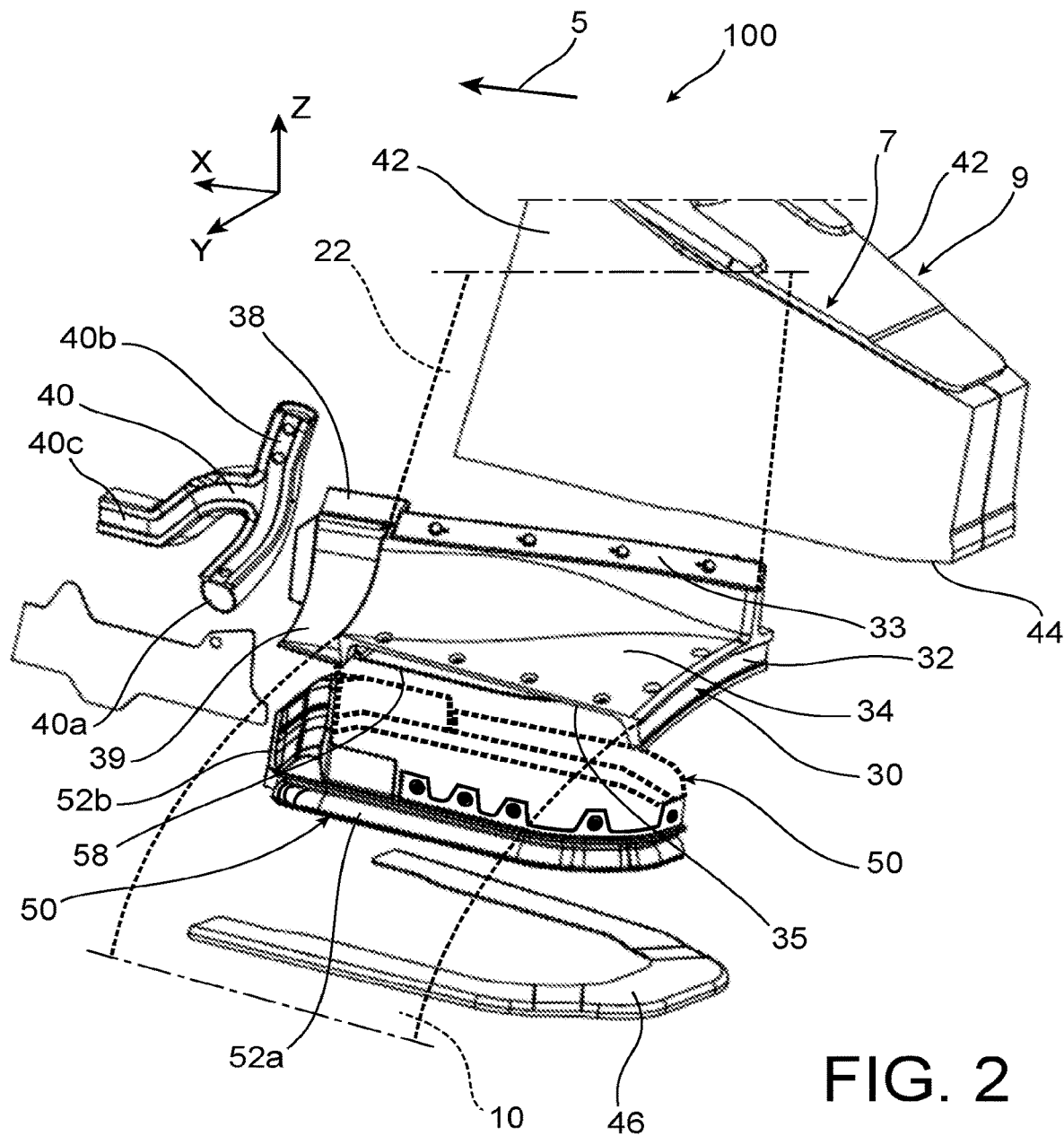
FIG. 2 represents a perspective exploded view of a portion of the propulsion unit shown in FIG. 1.

The two connecting cowlings 30 may have identical or similar designs, by being for example designed symmetrically in relation to a longitudinal plane XZ passing through the axis 2. This configuration is schematically represented in FIG. 2, also showing the association of two devices 50 specific to the invention that join at their upstream end in order to jointly define a profile similar to that of the peripheral bearing surface 46, against which they collapse.

With reference to FIGS. 2 to 5, only one of the two devices 50 will be described, the designs of which are identical or similar, by being for example designed symmetrically in relation to the longitudinal plane XZ passing through the axis 2.

The fire resistance device 50 is thus placed between the upstream end 7 of the strut, and its associated connecting cowling 30 on which this same device is fastened. Generally, the device 50 has a first contacting lip 52*a* as well as a second contacting lip 52*b*, the first lip 52*a* resting against a radially outer surface of the peripheral bearing surface 46, on a half-portion of it. This first contacting lip 52*a* prevents a fire that breaks out in the inter-flow compartment 8*a* from spreading circumferentially towards the lateral face 42 of the strut, or radially towards the outside in the direction of an upstream end face of this same strut.

The second contacting lip 52*b* rests for its part on the lateral face 42 of the strut, downstream of the two portions 40*a*, 40*b* of the nacelle seal 40. It is designed to stop the possible fire in the inter-flow compartment 8*a* so that it does not spread axially downstream, along the lateral face 42 of the strut.

With its lips 52*a*, 52*b*, the device 50 offers a clever and efficient solution for giving the fire-prevention function, despite the relative movements likely to be observed between the turbojet and the strut, during the various flight phases of the aircraft.

Figure 5:
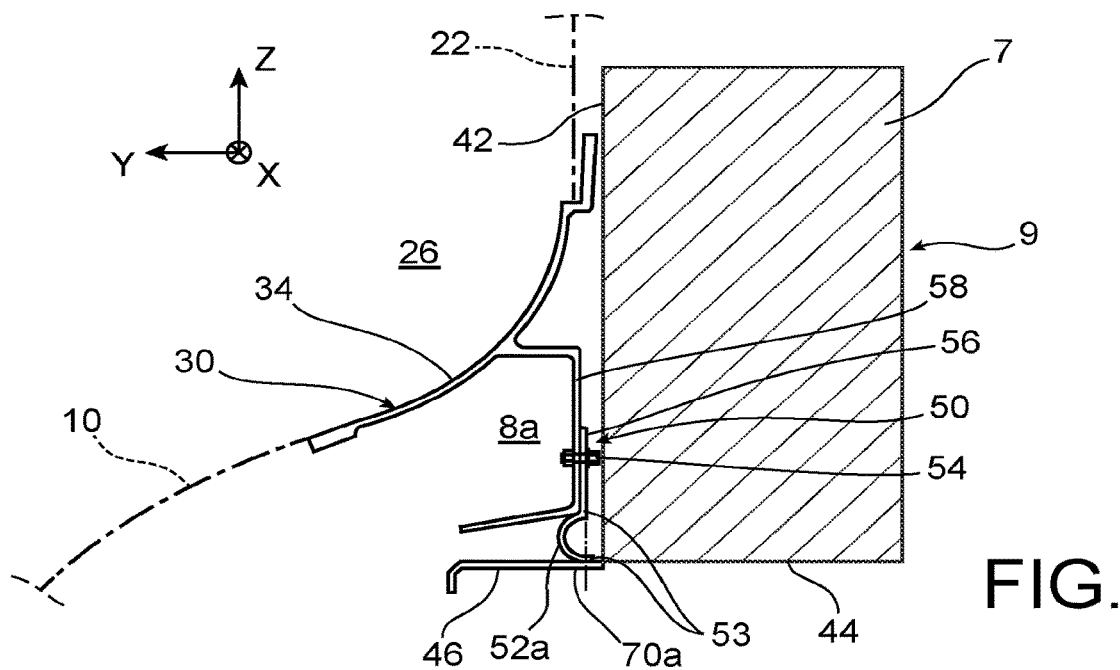
FIG. 5 is a sectional view taken along the line V-V of FIG. 4.

FIG. 5 shows the first lip 52*a* with a low level of compression, resulting from the relative position between the turbojet and the strut. This first lip 52*a* has a C-shaped, preferably semi-circular, transverse section corresponding to its nominal shape in the unstressed state. Thus, when the first lip 52*a* is compressed, it has a shape tending to flatten/ovalise that leads its two circumferential ends 53 to move closer to one another, in the compression direction corresponding to the direction Z.

One of the two circumferential ends 53 rests against the peripheral bearing surface 46, by being substantially tangent to this bearing surface. The other end 53 is supported by a fastening portion 56, traversed by fastening elements 54 of the bolts or rivets type. Indeed, these elements 54 traverse the fastening portion 56 of the device 50, as well as a first support 58 of the connecting cowling 30, located radially towards the inside between the latter and the peripheral bearing surface 46. The first support 58 is generally U-shaped open laterally towards the outside, whereas the first semi-circular lip 52*a* is open laterally towards the inside.

Thus, the fastening portion 56 extends in the direction Z downwards parallel with the base of the U 58, until connecting to one of the circumferential ends 53 of the first semi-circular lip 52*a*. The flexible connection area between the fastening portion 56 and the end 53 is located close to the connection area between the base of the U and its lower branch. Consequently, the upper portion of the first lip 52*a* preferably rests against the lower branch of the first U-shaped support 58.

Furthermore, in cross section such as that of FIG. 5, the two circumferential ends 53 of the first lip 52*a* are preferably inscribed on a vertical imaginary line along which extends the fastening portion 56. This geometry is in particular observed in the unstressed state of the first lip 52*a*. Nevertheless, it is specified that the design of the fire resistance device 50 makes it possible to keep the contact between the first lip 52*a* and the peripheral bearing surface 46, regardless of the relative movements observed between the turbojet and the strut, and this in each of the three directions X, Y and Z.

The circumferential end 53 cooperating with the bearing surface 46 defines most of a first contact end 70*a* of the device 50 with the strut. This first contact end 70*a* is completed by a small portion coming from an end section 71 referenced in FIGS. 6*a* to 6*d*. In this embodiment, the end section 71 is a bulb section, that is to say a tubular section, preferably of circular cross section of which the hollow preferably remains empty. This section 71 forms with the first lip 52a a contact structure 73 intended to rest on the peripheral bearing surface 46 of the strut.

The section 71 is arranged in the continuation of the downstream longitudinal end 75a of the first lip 52a. More specifically, the circular bulb section 71 has an upstream end 77a that is open, and that is in the continuation of the downstream longitudinal end 75a of the lip 52a. Consequently, at the transition between the lip 52a and the section 71 operated by the ends 75a, 77a, the contact structure 73 changes from a circular section to a semi-circular section, optionally progressively, but preferably abruptly. More generally, regardless of the shape of the lip 52a and that of the section 71, the contact structure 73 changes from a closed section (within the section 71), to half of this closed section (within the U-shaped lip 52a).

The outside and inside diameters of the two ends 75a, 77a are respectively substantially identical. These diameters are for that matter substantially constant over the entire length of the contact structure 73, even if minor variations can be observed, for example in a range of more or less 15%.

The downstream end 77b of the section 71 is blocked. It is domed, for example in the shape of a dome. Thanks to this blocking as well as the tubular shape of the section 71, this downstream portion of the contact structure 73 ensures a sealing that is reinforced and easier to obtain, due to a greater transverse area than that of the first C-shaped lip 52a extended by this section. In particular, this makes it possible for this portion 71 to contact both the peripheral bearing surface 46, and the lateral face 42 of the strut 9.

Figure 6A:
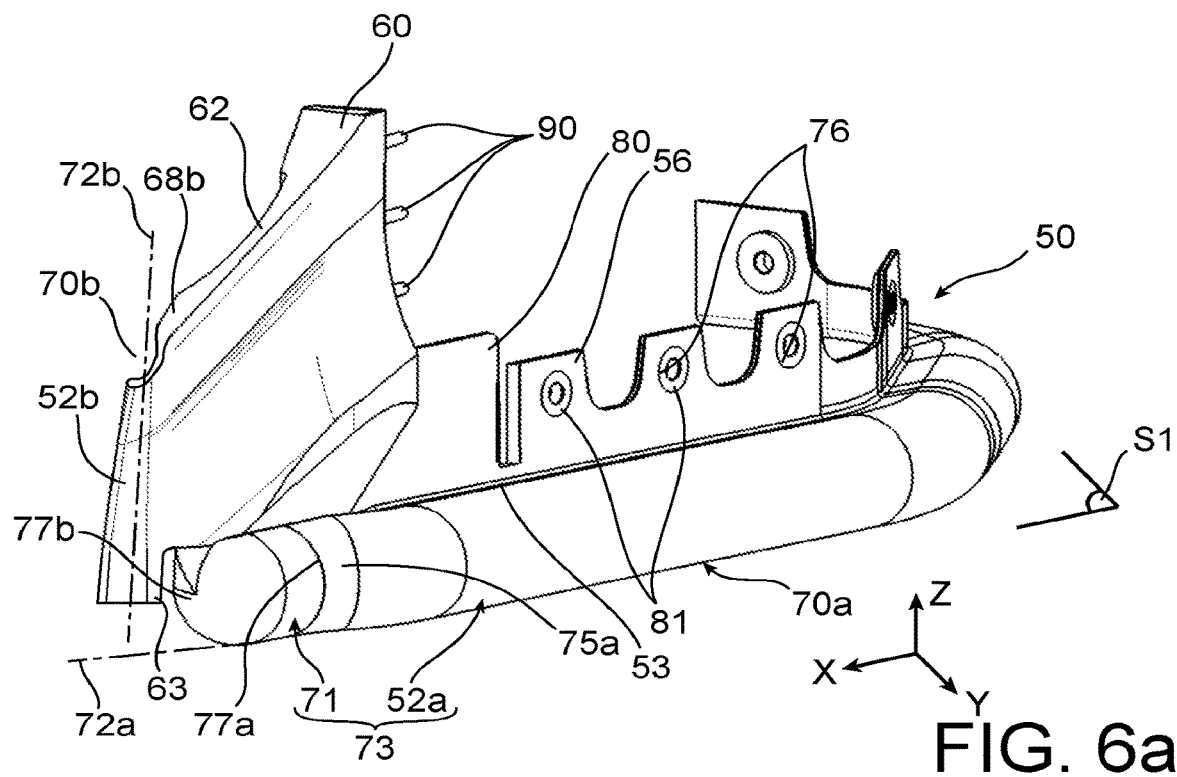
FIG. 6a is a perspective view of the fire resistance device shown in the preceding figures.

As mentioned previously, the circular bulb section 71 only constitutes a small portion of the contact structure 73, namely only its downstream end. Preferably, its length represents no more than 20% of the total length of the contact structure 73, and also more preferably, represents a percentage lower than 15%. In this regard, FIGS. 6b' and 6c' represent an alternative embodiment wherein the end portion 71 only extends over a short length. This portion 71 no longer necessarily has a bulb section, but it may be reduced to a general dome shape open at its upstream end 77a connecting to the first lip 52a, and blocked at its downstream end 77b. In other terms, this portion 71 is reduced at the dome-shaped blocked end of the portion 71 of the embodiment shown in FIGS. 6a to 6d. As is best seen in FIG. 6c', the radially lower end of the dome-shaped section 71 may have a notch 55 opening at the upstream end 77a. This notch 55 enables a further controlled deformation of the section 71, in compression during the operation of the propulsion unit.

Regardless of the embodiment envisaged, as for the lip 52a, the circular/dome shape of the section 71 corresponds to its nominal shape, observed in the unstressed state. Thus, once arranged on the propulsion unit, this section 71 is also subjected to a flattening/an ovalisation resulting from relative movements between the turbojet and the strut, and this in each of the three directions X, Y and Z. Other types of deformation may nevertheless be observed on this section essentially stressed in compression, without departing from the scope of the invention.

Together, the first contacting lip 52a and the radially lower end of the section 71 make it possible to establish a first sealing line on the peripheral bearing surface 46. As shown in FIG. 7, this concerns a first curved line 72a, following the profile of the bearing surface half-portion 46 associated with the contact structure. The first contact end 70a of this contact structure 70 (not represented in FIG. 7 but visible in FIGS. 6a and 6b), extends along this first curved line 72a, generally L-shaped.

The device 50 also integrates the aforementioned second lip, the function of which is to establish a second sealing line 72b on the lateral face 42 of the strut 9. This second line is preferably straight, substantially parallel with the direction Z. Preferably, the two lines 72a, 72b shown in FIG. 7 join at a radially inner downstream end of the device 50. Although the contact structure and the second lip may be directly adjacent at the end section, they may alternatively be connected by a material connection 79 visible in FIGS. 6b, 6b', connecting the blocked downstream end 77b of the section 71 to the second contacting lip 52b.

Again with reference to FIGS. 6a to 6d, 6b' and 6c', the device 50 will be described in more detail. In these figures, it is first of all represented the first curved line 72a, along which come in succession the first lip 52a and the end section 71. The line 72a is inscribed in a first substantially flat contact surface S1, which corresponds to the radially outer surface of the peripheral bearing surface 46. This surface S1 may be strictly flat, or have one or more very shallow levels, for example not exceeding a few millimetres. The surface S1 thus preferably corresponds to a plane XY of the propulsion unit 100. Furthermore, the first curved line 72a that is inscribed in this XY plane is indeed generally L-shaped, of which the angle between the base of the L and the branch of the L may be rounded, and of which the free end of the branch may also be rounded.

The fastening portion 56 extends upwards in the direction Z from the lip 52a, in the form of a lamella pierced with through holes 76 intended to be traversed by the aforementioned bolts 54. The through holes 76 may be reinforced by inserts 81 attached later on the device 50.

At the downstream longitudinal end 75a of the first lip 52a, or upstream of it, the device 50 includes a support portion 60 that also extends substantially upwards in the direction Z, from the upper circumferential end 53 of this lip. More specifically, this support portion 60 has a greater thickness, and it is adjacent to a rib 80 provided to reinforce the mechanical strength of the device 50. The rib 80 is placed between the fastening portion 56, and the support portion 60 in block form. It also extends substantially upwards in the direction Z, parallel with the fastening portion 56 from which it may be moved apart, in the direction of the first curved line 72a. The rib 80 has an intermediate thickness between that of the fastening portion 56, and that of the support portion 60. The same applies for its height in the direction Z.

The aim of the support portion 60 is to support the second lip 52b, via a junction area 62 placed between them. The junction area 62 has a reduced thickness, and serves as articulation at the second lip 52b that preferably remains straight and not or little deformed during bending, regardless of the compression level endured.

The junction area 62 extends from the support portion 60 substantially in the direction X, downstream. At its radially inner end, the junction area 62 supports the upper portion of the section 71, which is located downstream of the lip 52b supported by the downstream end of this same junction area 62.

The second contact end 70b of the second lip 52b extends along the second line 72b preferably straight, and preferably substantially orthogonal to the first contact surface S1. Thus, the second straight line 72b preferably extends substantially in the direction Z, so that the lip 52b contacts the associated lateral face of the strut.

Figure 6B:
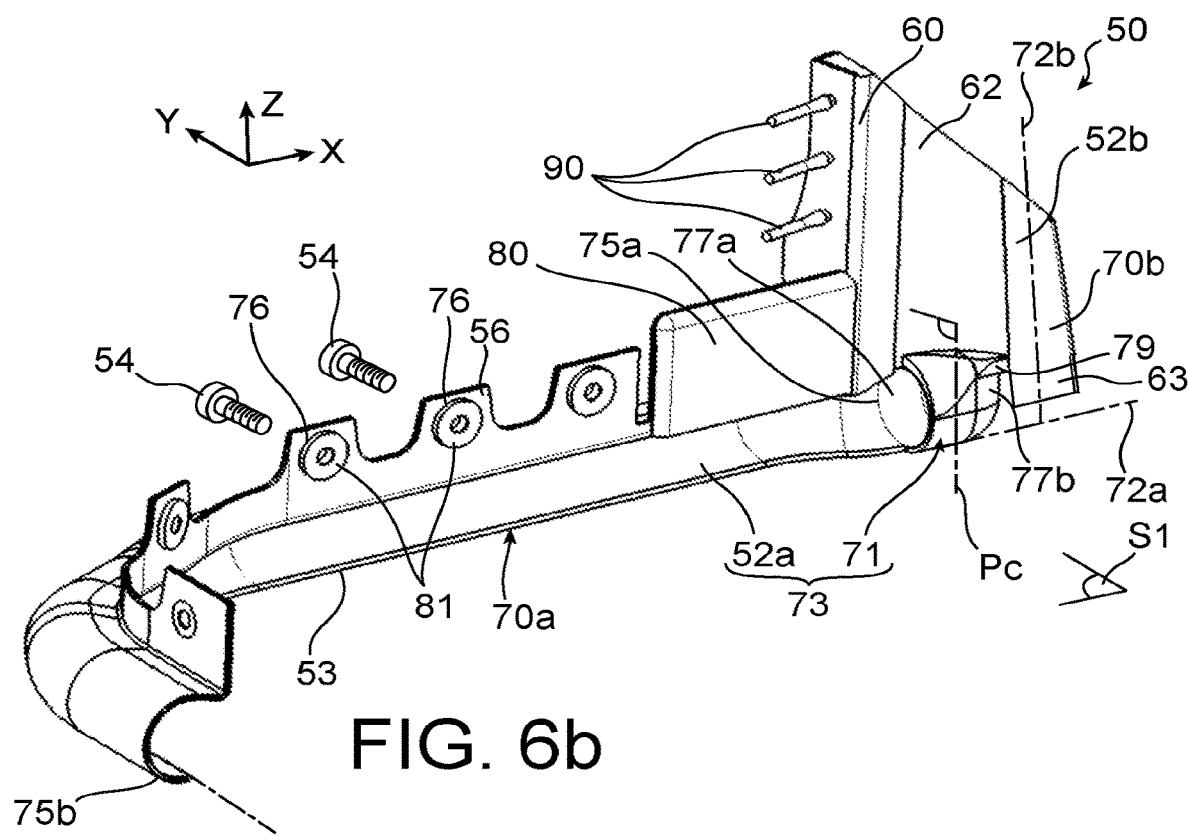
FIG. 6b is a perspective view similar to the preceding, according to another view angle.
Figure 6B:
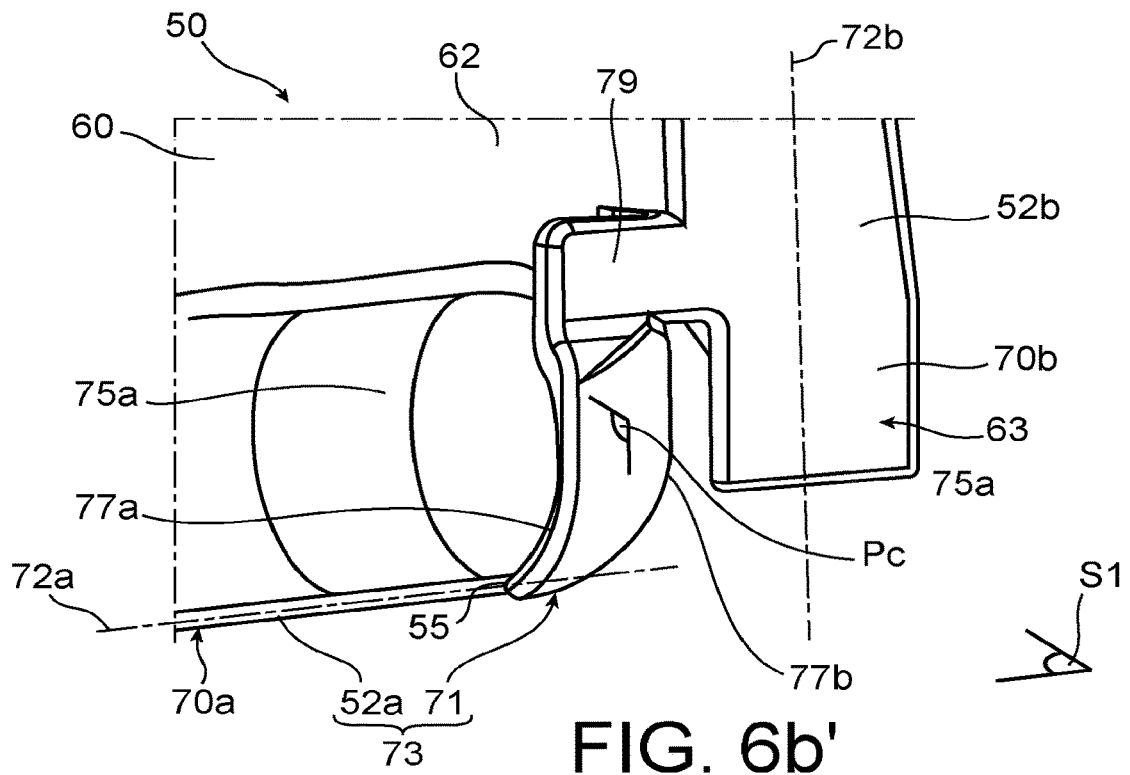
Figure 6C:
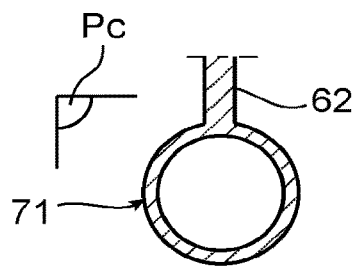
FIG. 6c is a sectional view taken along the plane Pc of FIG. 6b, crossing the end section.
Figure 6C:
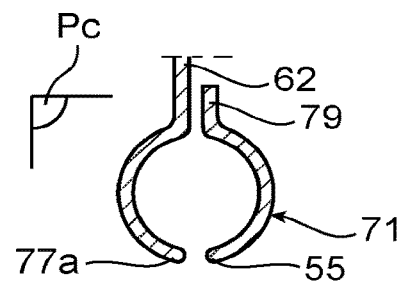
Figure 6D:
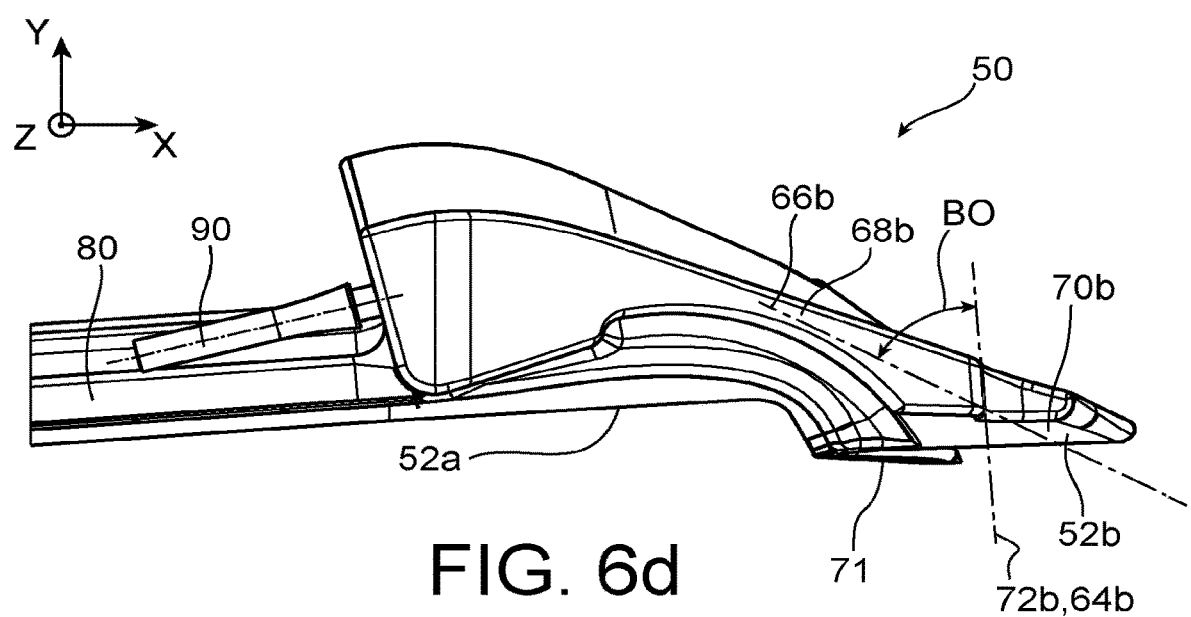
FIG. 6d is a top view of a portion of the fire resistance device shown in FIGS. 6a and 6b.
Figure 7:
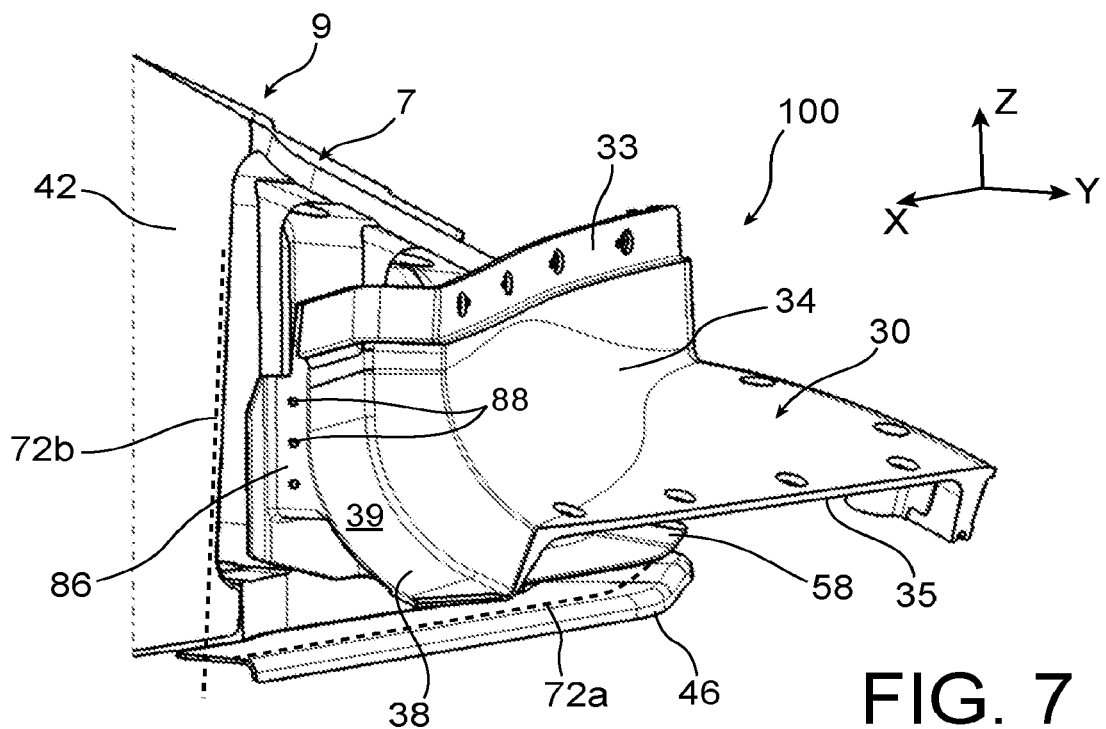
FIG. 7 is a perspective view of the portion shown in FIGS. 2 to 4, schematising the sealing line obtained thanks to the fire resistance device.

The outer radial end of the unit formed by the elements 60, 62 and 52b is bevelled, as is best seen in FIG. 6b.

In addition, the second contacting lip 52b has a thickness increasing from its base 68b referenced in FIG. 6a, towards the second contact end 70b. Consequently, the latter may have a surface character, for example in the form of a flat vertical strip. In the unstressed state represented in this FIG. 6d, an angle of inclination B0 may be observed between a normal 64b at the lateral face of the strut (not represented), and a second general lip direction 66b defined between the base 68b, and the second contact end 70b of the lip 52b.

Figure 8:
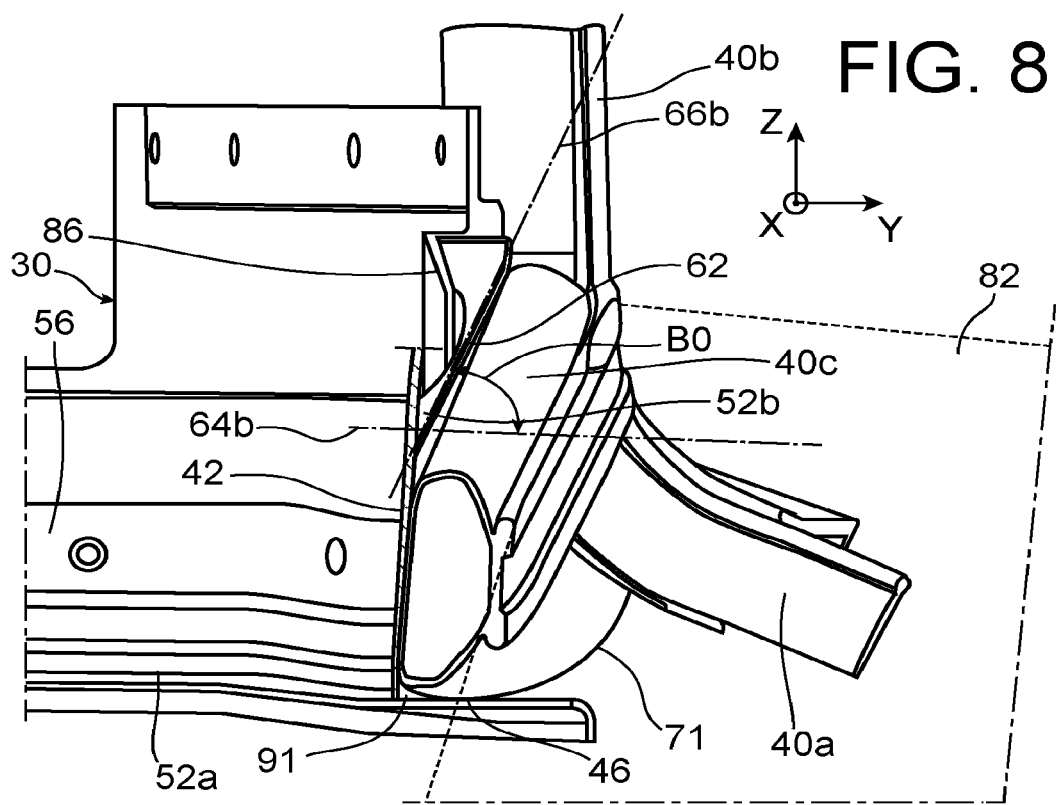
FIG. 8 represents a perspective view of the portion shown in FIGS. 2 to 4, showing in particular the second contacting lip of the fire resistance device, in the stressed state.

In the assembled state of the device 50, its second contacting lip 52b is stressed in the direction Y by the third portion 40c of the nacelle seal. With reference to FIG. 8, when the nacelle cowl 82 (only represented schematically) is closed, the third branch 40c of the seal 40 integral with this cowl presses on the second lip 52b. This is then stressed between the lateral face 42 of the strut and the third portion 40c of the joint 40, involving a pivoting of the lip 52b according to its junction area 62. Due to this pivoting, the angle B0 increases in relation to that observed in the unstressed state of FIG. 6d. The value of this angle B0 depends on the compression level of the fire resistance device 50, which itself depends on the amplitude of the relative movements between the turbojet and the strut. FIG. 8 also shows that the third portion 40c of the seal 40 is stressed in the direction Y, meaning that its tubular sealing portion is deformed between the nacelle cowl 82 and the lip 52b. Thus, the tubular portion that has a substantially circular-shaped section in the unstressed state, flattens under the stress, adopting a shape for example elliptical, oval or similar.

This FIG. 8 also shows that the presence of the section 71 greatly limits the leakage section 91 between the lateral face 42 of the strut and this same section, even at significant deformation levels leading to high values for the angle B0. The fact of providing such a downstream end, dome-shaped downstream and open upstream, helps to easily obtain a satisfactory and controlled sealing with the lateral face 42 of the strut. The leakage section 91 thus remains reasonable, even during a significant pivoting of the second lip 52b. This section 91 is for that matter restricted by the particular shape of the second lip 52b, which will be described later with reference to FIGS. 6a, 6b, 6b', 6c', 15 and 16.

Still with reference to FIG. 8, it is shown that the support portion 60 of the device 50 is received in a second support portion 86, provided on the connecting cowling 30, at its downstream end 38 forming the seal housing 39 that can be seen in FIG. 2. The second support 86, which is best seen in FIG. 7, has holes 88 intended to receive the elongated fastening elements 90 supported by the support portion 60, on the side apposed to that where the lip 52b and its junction area 62 is located. These elongated elements 90, are produced in one piece with the device 50, or attached on the latter. They are for example formed by rods the end of which is intended to collapse on the surface opposite the second support 86 that they extend across.

Another specific feature of the invention resides in the one-piece manufacture of the fire resistance device 50. In other terms, all of the aforementioned elements of the device 50 are produced in one piece, preferably by compression moulding. This one-piece manufacture is for that matter not called into question by the presence of the bulb section, since it remains open at one of its axial ends, and preferably only extends along a very short length.

The elongated fastening elements 90 are optionally integrally integrated into this part, whereas the inserts 81 are considered as elements attached outside of the device, because forming part of its means for fastening on the connecting cowling 30.

For the manufacture of the device 50, this may concern a single elastomer block, but the latter is preferably combined to one or more layers of various functionalities.

Figure 9:
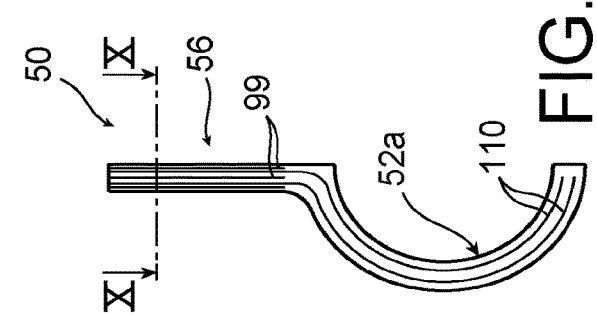
FIG. 9 is a sectional view taken along the line IX-IX of FIG. 10.
Figure 10:
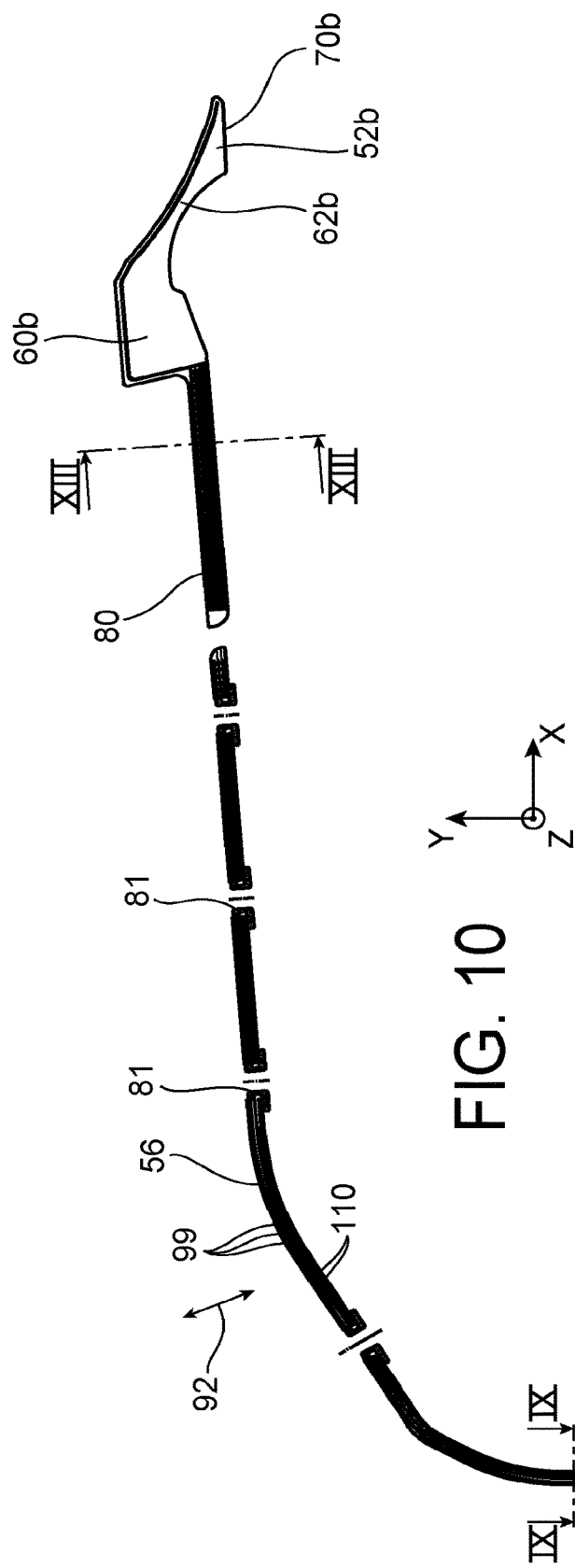
FIG. 10 is a sectional view taken along the line V-V of FIG. 9.
Figure 11:
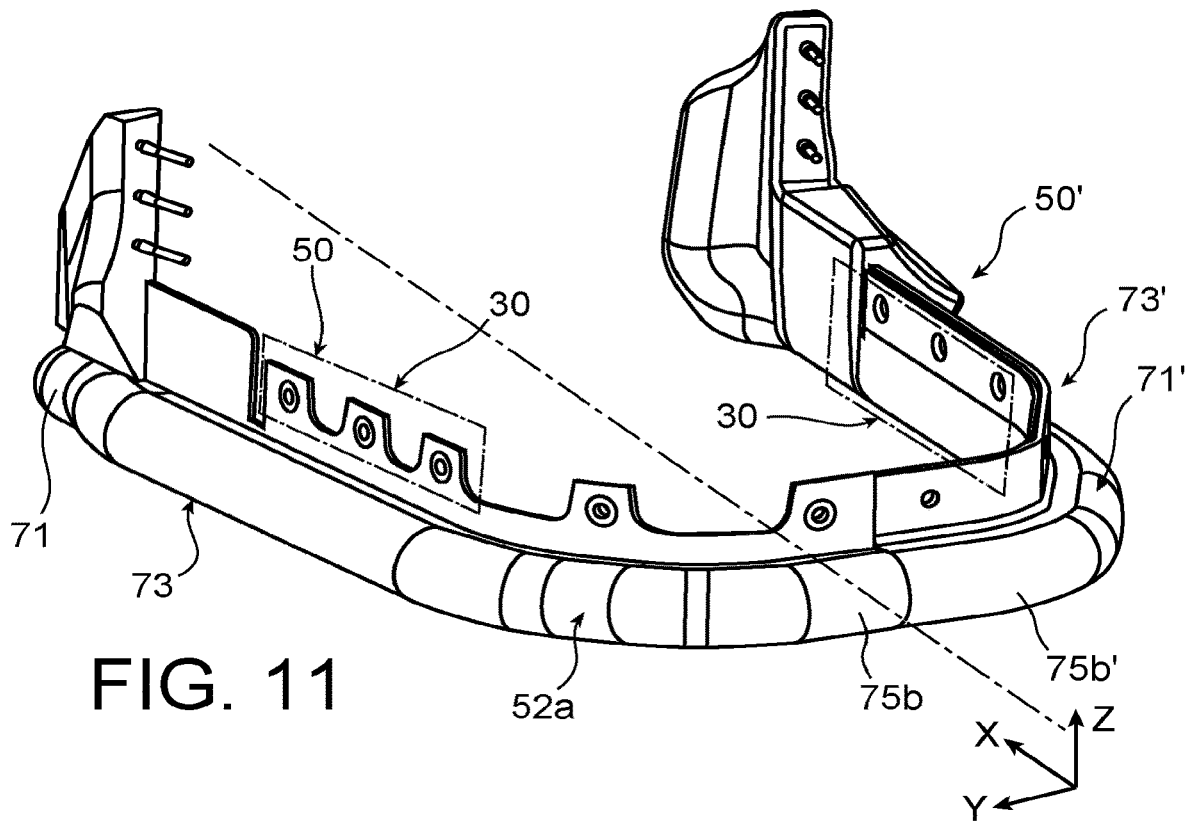
FIG. 11 represents the association between a fire resistance device such as shown in the preceding figures, and an additional conventional device.
Figure 12:
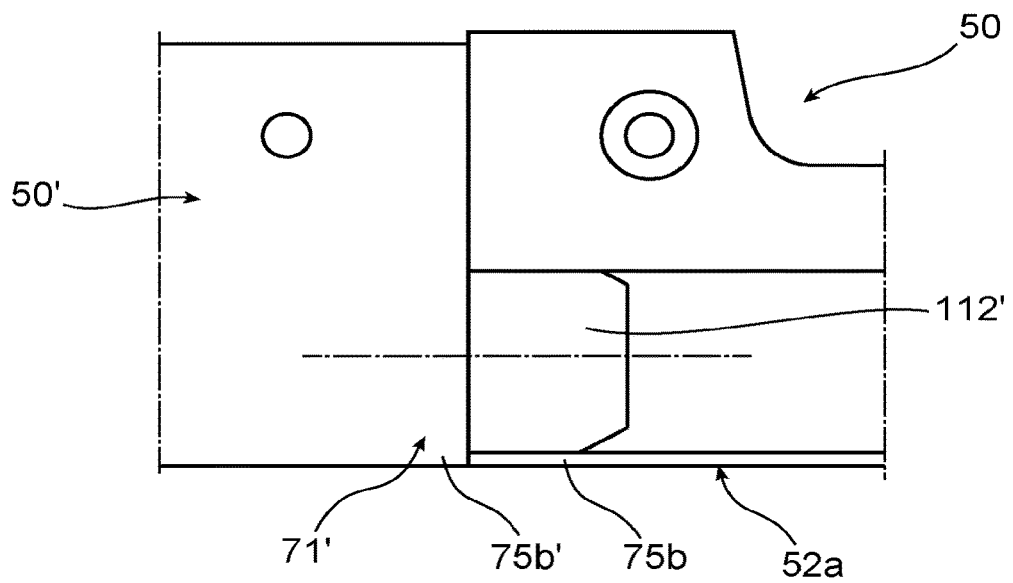
FIG. 12 is a rear view of a portion of the association of devices shown in FIG. 11.
Figure 13:
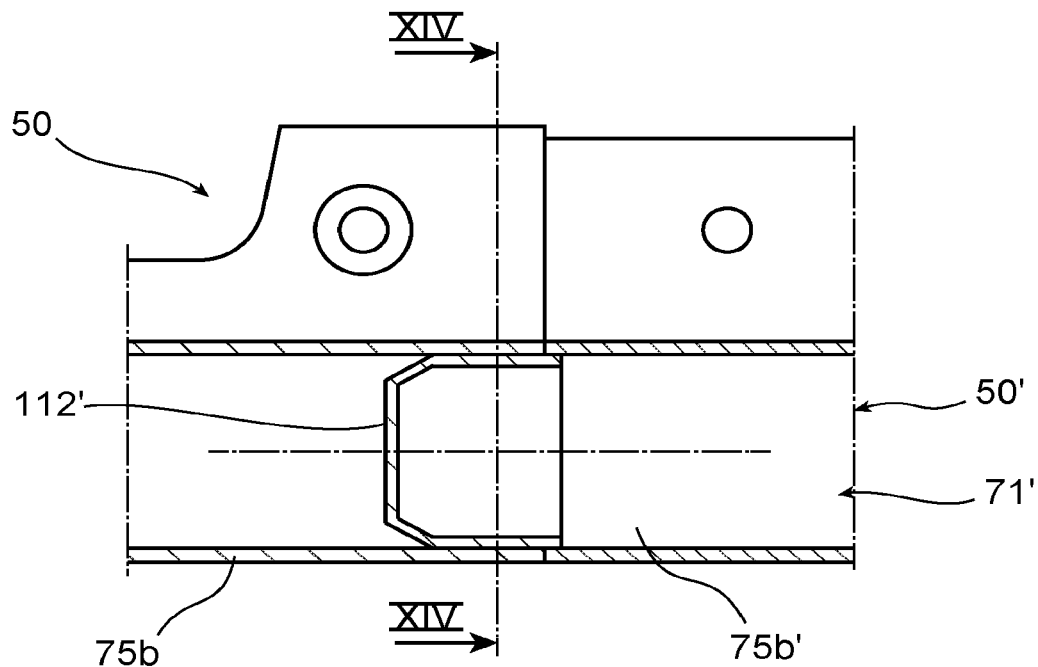
FIG. 13 is a sectional view, similar to the view of the preceding figure.
Figure 14:
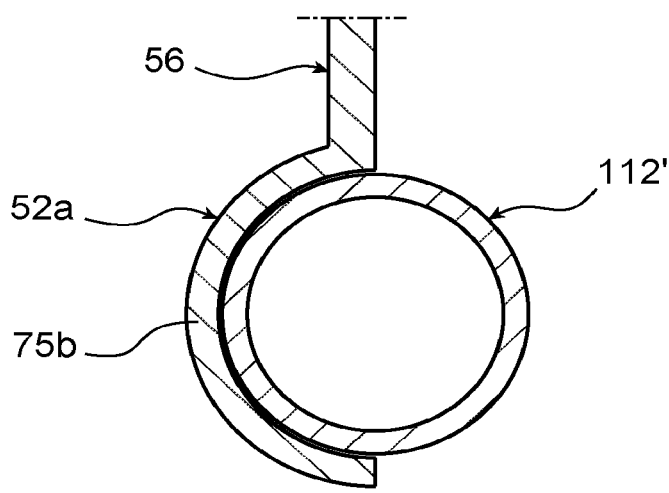
FIG. 14 is a sectional view taken along the line XIV-XIV of FIG. 13.

In the example represented in FIGS. 9 and 10, the device 50 is formed by the superposition, in the direction of the thickness 92 of the latter, of layers made of elastomer material 99 and preferably made of silicone elastomer material, and of functional fibrous layers 110. From the latter, this may concern glass fabric, ceramic or meta-aramid (poly(m-phenylene isophthalamide)) layers, which reinforce the stiffness of the device. Subsequently, it may be provided specific fire resistance layers, for example made of ceramic fibre. Preferably, these are arranged in the areas of the device the most exposed to the flame. The silicone elastomer material of the layers 99 degrading and transforming into silica in the event of significant heat, the fabrics used 110 make it possible, thanks to their meshing, to retain these degraded particles.

The alternation of layers may further be completed by meta-aramid fibrous layers 110, still for reinforcing the stiffness of the unit. One of these layers may even be coated on the outer surface of the lips, in order to limit their wear and their damage by the portions in contact.

The layers 99 and 110 are preferably parallel with one another, following the profile of the device 50. At least one or more of them may extend over the entire height of the device 50, and from one end to another of the latter in the direction of the first aforementioned curved line 72a.

In the direction X, the device 50 may have a length between 30 and 50 cm, whereas in the direction Y, the width of this device is in the order of 10 to 20 cm. Finally, in the direction Z, the maximum height of the device 50 may be in the order of 15 to 20 cm. Each lip 52a, 52b only extends over a few centimetres.

As regards the fire resistance procured by the device 50, in addition to complying with the normative requirements ISO 2685-1998 and AC 20-135, the most unfavourable conditions are considered, namely that in-flight fire resistance and on-ground fire resistance is sought. This involves particularly designing a solution ensuring the fire-prevention function in the following conditions:
  flame temperature: 1100±80° C.;
  vibration: ±0.4 mm under a frequency of 50 Hz;
  pressure: 0.4 bar for the first 5 minutes of the fire test;
  test duration: 15 min, broken down into 2 phases:
  5 min: Applied overpressure; and
  10 min: Atmospheric pressure;
  self-extinguishing within a limited time.

In the embodiments described above, two devices 50 specific to the invention are associated with the circumferential bearing surface 46. A junction between the two proves to be particularly easy at the upstream longitudinal ends 75b of their respective first lips 52a. Indeed, these two C-shaped ends 75b (one of which can be seen in FIG. 6b) may easily overlap, and thus offer a continuation for the fire resistance barrier at the junction area between the two devices 50.

But the invention also proves conducive to a fitting on an existing propulsion unit, in order to replace only one of the two conventional devices already in place on this unit. This functionality is represented in FIGS. 11 to 14, showing the association between a device 50 according to the invention, and an additional fire resistance device 50' of conventional design. The two devices are respectively intended to be fastened on the two connecting cowlings 30 of the propulsion unit.

The additional fire resistance device 50' has a conventional design, with a plurality of elements attached on one another. It globally includes a bulb seal 71' extending substantially over the entire length of the device 50', this seal being intended to be pinned against the peripheral bearing surface of the strut, in the manner of the contact structure 73 of the device 50. In the unstressed state such as represented in FIGS. 11 to 14, the bulb seal 71' has a circular-shaped section.

This bulb seal 71' thus constitutes the contact structure 73' of the additional device 50', and has an upstream longitudinal end 75b' equipped with a connecting pin 112'. This pin 112' is hollow, also of circular section of diameter smaller than that of the bulb, and optionally chamfered at its blocked end portion. As regards the device 50, the upstream longitudinal end 75b of its first contacting lip 52a, of C-shaped section, proves to be perfectly adapted to cooperate this connecting pin 112'. Indeed, the inside diameter of the C may be substantially equal to the outside diameter of the connecting pin 112', making it possible for the latter to be housed inside the C-shaped upstream longitudinal end 75b. This covering, which can be seen in FIGS. 12 to 14 and is similar to an interlocking, makes it possible to ensure the continuation of the fire resistance barrier at the junction between the new device 50, and the additional device 50' already installed on the propulsion unit. The replacement of only one of the two existing devices is thus facilitated by the design of the invention proposed.

Now with reference to FIGS. 6a, 6b, 6b', 6c', 15 and 16, it will be described the particular design of the second lip 52b. This does not end at the material ligament 79, but it includes at its radially inner end a blocking portion 63 protruding according to the second line 72b. This protruding portion 63 thus extends the lip 52b beyond the material ligament 79, in the direction of the first line 72a. Thus, it is arranged facing and at a distance from the blocked downstream end 77b of the end portion 71. In other terms, it faces the blocked downstream end 77b in the direction of the first line 72a, obstructing a flame that would spread axially downstream in the direction of this domed downstream end 77b.

Figure 15:
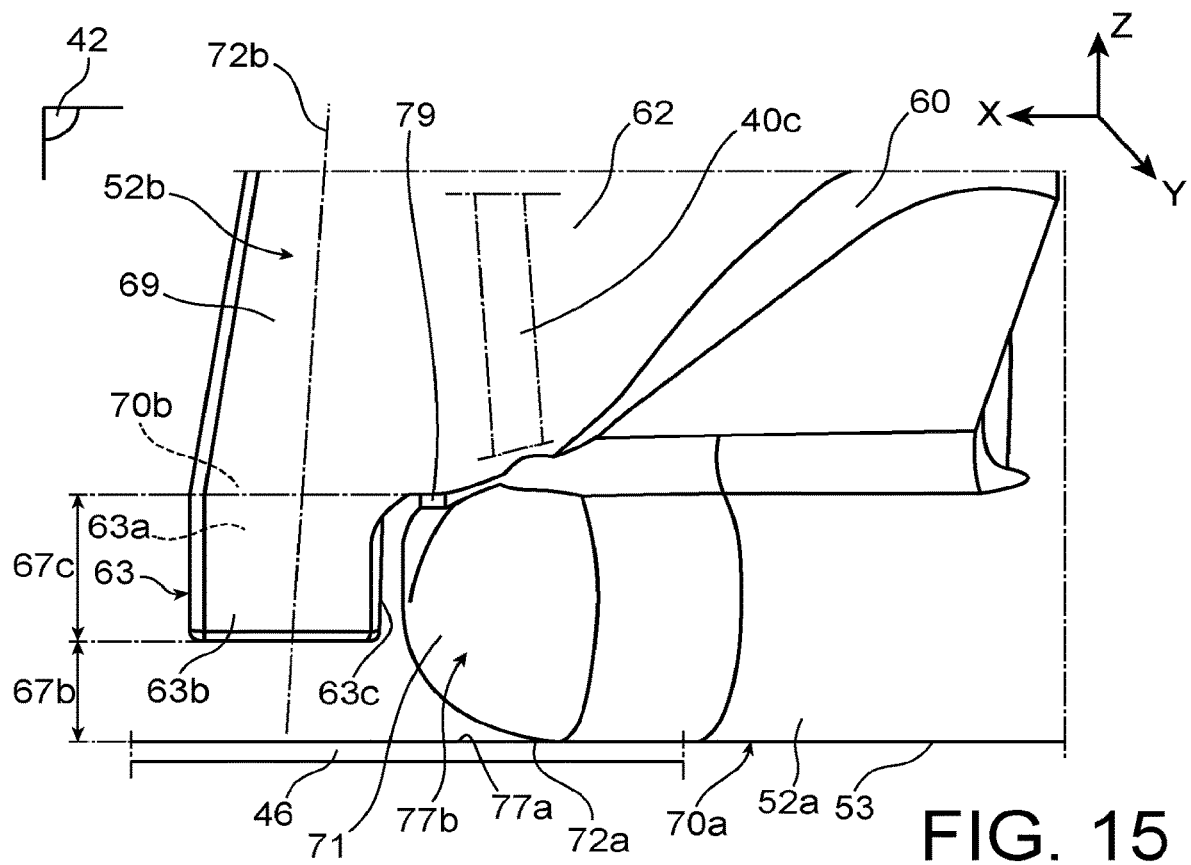
Figure 16:
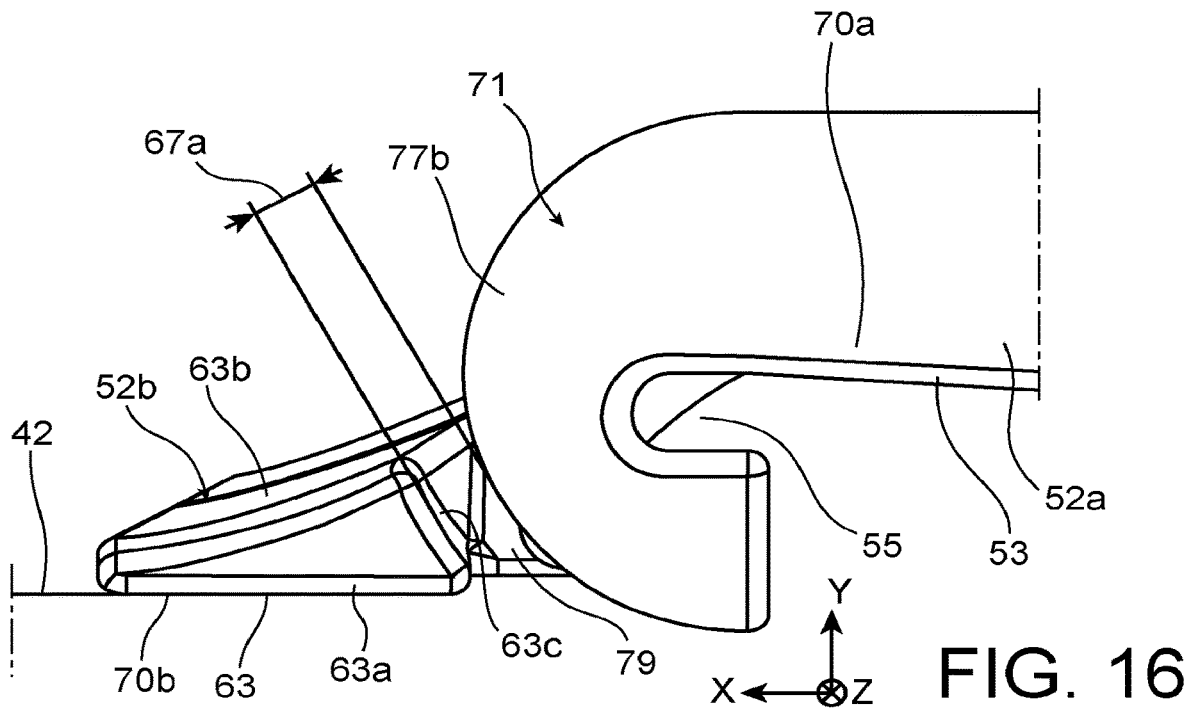
FIG. 16 is a bottom view of the portion of the device shown in the preceding figure.

With reference more specifically to FIGS. 15 and 16, it is noted that this blocking portion 63, in the form of a protrusion, has a geometry that is inscribed in the continuation of that of the remainder of the lip 52b. Consequently, it has a first contact face 63a forming the lower portion of the second contact end 70b, of substantially flat geometry in order to collapse against the lateral face of the strut. Opposite the first face, the protruding portion 63 has a second face 63b the shape of which is such that it makes it possible to deflect the flame in order to move it transversally apart from the lateral face of the strut, and prevent its penetration into the sensitive area. For this, the second face 63b moves away from the first contact face 63a as it moves closer to the blocked end 77b, the latter being domed in the direction of the protruding blocking portion 63. It thus adopts a curved shape, for example with a simple curvature in order to define a transverse flame deflection ramp.

The second face 63b is also located in the extension and in the continuation of an outer surface of the upper portion of the second lip 52b, this surface being referenced 69 in FIG. 15. The outer surface 69, also of curved shape, is intended to be covered by the third nacelle seal portion 40c. On the other hand, during operation, this nacelle seal portion 40c is not intended to cover the protruding portion 63 of the second lip 52b, since this protruding portion 63 extends radially lower than the seal portion 40c. In this regard, if the invention provides that the blocking portion 63 is protruding downwards according to the second line 72b, its protruding length preferably remains limited so that it ends set back in relation to the first contact end 70a, therefore set back in the direction Z. This limits the risks that this blocking portion 63, in contact with the lateral face of the strut, also comes into contact with the peripheral bearing surface 46 against which the first contact end 70a presses. The gap 67b between the lower end of the blocking portion 63 and the bearing surface 46, in the direction of the second line 72b, may be between 8 and 13 mm, and for example in the order of 11 mm. The protruding distance 67c of the blocking portion 63 may for its part be between 10 and 20 mm, for example in the order of 16 mm. Thus, the blocking portion 63 preferably ends beyond a centre of the domed blocked end 77b, in the direction of the second line 72b.

The two faces 63a, 63b are connected upstream to a third connection face 63c of the blocking portion 63, defining an axial gap 67a with the blocked end 77b. This gap 67a, referenced in FIG. 16, may be between 2 and 5 mm, by being for example in the order of 3.5 mm. In this same figure, it is shown that the second face 63b, the gap 67a and the blocked end 77b together define a chicane. This considerably reduces the risk that the flame follows it until spreading through the possible leakage section mentioned above, emanating from the deformation of the blocked end 77b of the contact structure.

Figure 17:
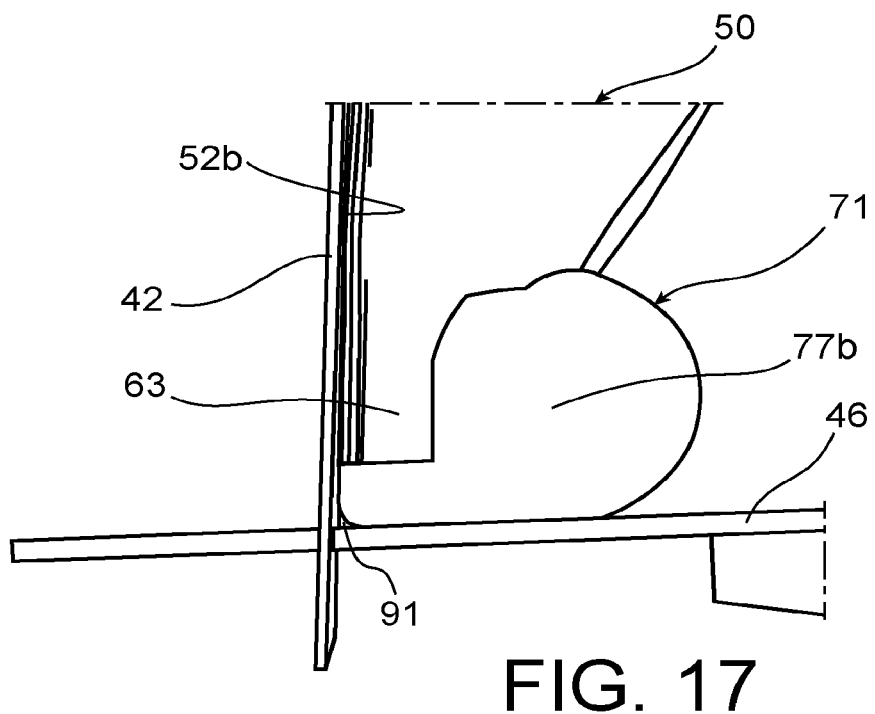
FIG. 17 represents an axial view from downstream, showing in particular the second contacting lip of the fire resistance device, in the minimum stress state.
Figure 17A:
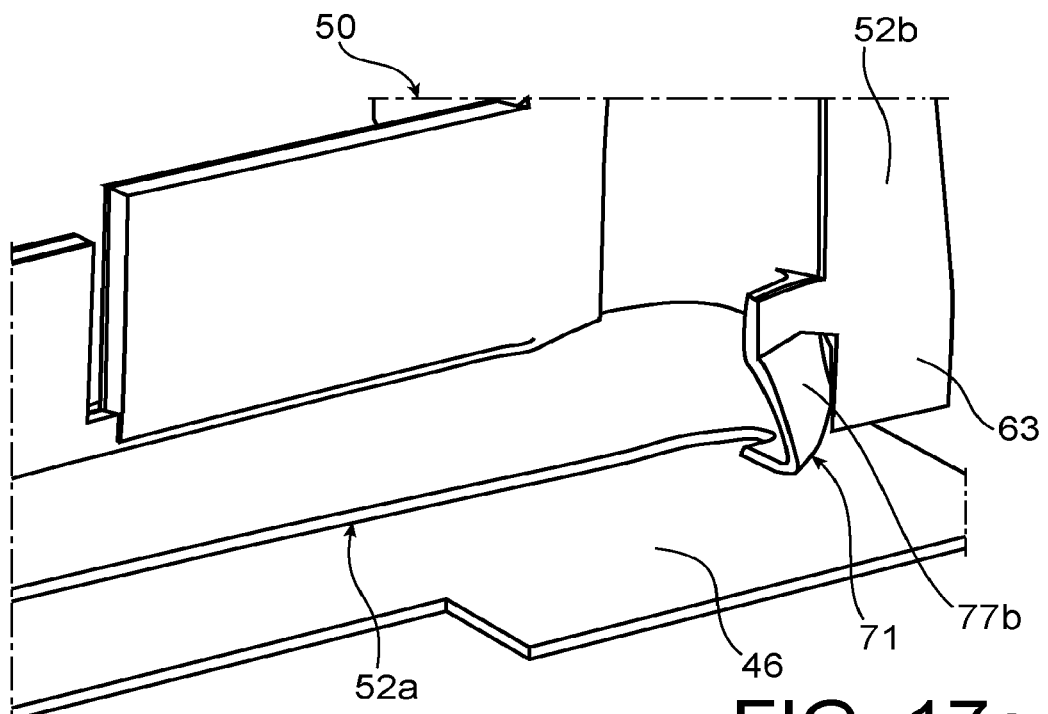
FIG. 17a represents a perspective view of the device subjected to the same stress state as that of FIG. 17.

Now with reference to FIGS. 17, 17a, 18 and 18a, it is shown the device 50 in various stress states against the peripheral bearing surface 46. FIGS. 17 and 17a show a minimum stress state, wherein the leakage section 91 between the lateral face 42 of the strut and the blocked end 77b of the section 71, at the bearing surface 46, is minimal. In this state, the blocking portion 63 of the lip 52b may not be low enough to form an axial obstacle to the flame heading towards the leakage section 91 adjacent to the bearing surface 46. However, this remains without harmful consequences, since the very small section 91 observed at this stress level reduces the risks of penetration of the flame into the sensitive area of the strut. In addition, even at this low stress level, the blocking portion 63 may form an axial obstacle to the flame heading towards any other leakage section that could occur along the face 42 of the strut, at a distance from the bearing surface 46, and still resulting from the deformation of the blocked end 77b.

Figure 18:
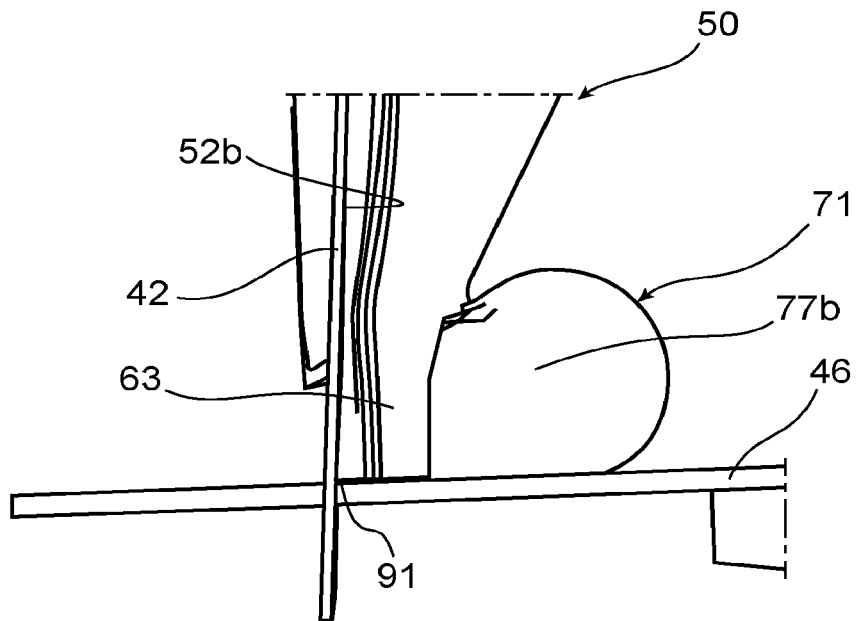
FIG. 18 represents an axial view from downstream similar to that of FIG. 17, showing in particular the second contacting lip of the fire resistance device, in the maximum stress state.
Figure 18A:
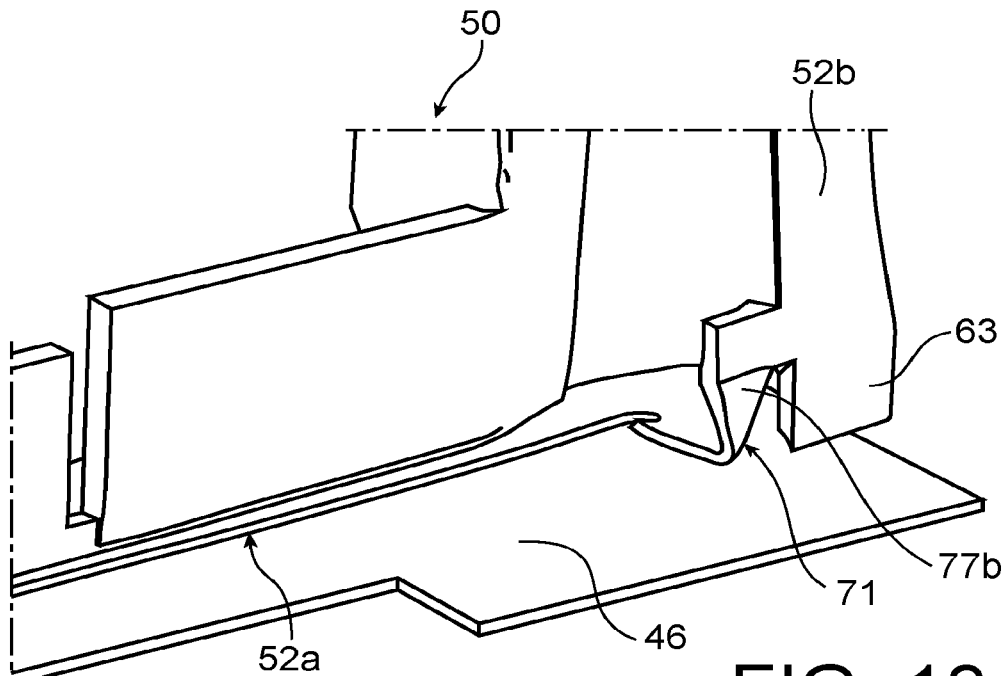
FIG. 18a represents a perspective view of the device subjected to the same stress state as that of FIG. 18.

FIGS. 18 and 18a show a maximum stress state, wherein the covering of the blocked end 77b by the blocking portion 63 is optimal. Any leakage section (not visible) between the lateral face 42 of the strut and the deformed end 77b of the section 71 is therefore protected from the flame by the blocking portion 63, axially arranged facing this section.

Of course, various modifications may be made by the person skilled in the art to the invention that has just been described, only by way of non-limiting examples and of which the scope is defined by the appended claims.

The invention claimed is:

1. A fire resistance device intended to be placed between an upstream end of a mounting strut of a double-flow aircraft turbomachine, and a connecting cowling equipping said turbomachine, said connecting cowling being intended to connect an upstream ring radially delimiting towards the outside a portion of an inter-flow compartment, to an arm that extends radially across a secondary flow of the turbomachine, wherein the device comprises:

a contact structure comprising a first contacting lip, and defining a first contact end extending along a first line, the contact structure also comprising, at one of the longitudinal ends of the first contacting lip, an end section, wherein the end section comprises an open end which forms a continuation of the first contacting lip, wherein the end section further comprises a blocked end, wherein said open end and said blocked end are spaced relative to each other along said first line;

a support portion; and a second contacting lip supported by the support portion via a junction area that supports the end section of the contact structure, the second contacting lip having a second contact end extending along a second line different from the first line, the second contacting lip having at one of its ends a blocking portion protruding according to the second line, the blocking portion being located at a distance from and facing the blocked end of the end section.

2. The fire resistance device according to claim 1, wherein the blocking portion has a first contact face foiling a portion of the second contact end of the second contacting lip, as well as a second face opposite the first and moving away from the first contact face by moving closer to the blocked end of the end section, the second face being curved.

3. The fire resistance device according to claim 1, wherein the blocked end of the end section has a domed shape in the direction of the blocking portion belonging to the second contacting lip.

4. The fire resistance device according to claim 1, wherein in the direction of the second line, the blocking portion ends set back in relation to the first contact end.

5. The fire resistance device according to claim 1, wherein said device is in one piece.

6. The fire resistance device according to claim 1, wherein said second line is straight, and substantially orthogonal to a first substantially flat contact surface.

7. The fire resistance device according to claim 1, further comprising a fastening portion supporting the first contacting lip, said fastening portion being traversed by fastening element through holes.

8. A propulsion unit for aircraft comprising a double-flow aircraft turbomachine, as well as a mounting strut of the turbomachine intended to fasten it on a wing element of the aircraft, the turbomachine including an inter-flow compartment arranged between a primary flow and a secondary flow of the turbomachine, as well as an arm that extends radially across the secondary flow and communicating with the inter-flow compartment, the latter being partly radially delimited towards the outside by an upstream ring connected to the arm with the aid of two connecting cowlings respectively arranged on either side of an upstream end of the mounting strut, in a transverse direction of the propulsion unit, the upstream end of the mounting strut comprising two lateral faces, as well as a peripheral bearing surface following the contour of a base of this upstream strut end, wherein the propulsion unit also comprises, associated with at least one of the two connecting cowlings, a fire resistance device according to claim 1, placed between the upstream end of the mounting strut and the connecting cowling to which the device is fastened.

9. The propulsion unit according to claim 8, wherein the first contact end of the first contacting lip rests on the peripheral bearing surface of the upstream end of the mounting strut, and wherein the second contact end of the second contacting lip rests on the corresponding lateral face of the upstream end of the mounting strut.

10. The propulsion unit according to claim 8, wherein a first curved line is inscribed in a first substantially flat contact surface, and substantially parallel with the transverse direction as well as with a longitudinal direction of the unit, and wherein the second line defined by the second contacting lip is a straight line extending substantially parallel with a vertical direction of the unit.

11. The fire resistance device according to claim 1, wherein said blocked end of said end section is blocked in a direction of said first line.

12. The fire resistance device according to claim 11, wherein said first and second contacting lips are configured to contact two different surfaces inclined relative to one another.

13. The fire resistance device according to claim 11, wherein said first and second lines are inclined relative to each other.

* * * * *

UNITED STATES PATENT AND TRADEMARK OFFICE
CERTIFICATE OF CORRECTION

PATENT NO. : 11,920,519 B2
APPLICATION NO. : 17/311539
DATED : March 5, 2024
INVENTOR(S) : Bruno Alexandre Didier Jacon et al.

It is certified that error appears in the above-identified patent and that said Letters Patent is hereby corrected as shown below:

In the Claims

In Column 15, Claim 2, Line 20, delete "foiling" and insert -- forming --, therefor.

Signed and Sealed this
Sixteenth Day of July, 2024

Katherine Kelly Vidal
*Director of the United States Patent and Trademark Office*